(12) United States Patent
Wieres et al.

(10) Patent No.: US 8,500,835 B2
(45) Date of Patent: Aug. 6, 2013

(54) HOLLOW BODY FOR CAPTURING PARTICLES IN AN EXHAUST GAS LINE, EXHAUST-GAS TREATMENT DEVICE AND MOTOR VEHICLE

(75) Inventors: Ludwig Wieres, Overath (DE); Joachim Sittig, Rösrath (DE); Hubertus Kotthoff, Ruppichteroth (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 13/419,643

(22) Filed: Mar. 14, 2012

(65) Prior Publication Data

US 2012/0186205 A1    Jul. 26, 2012

Related U.S. Application Data

(63) Continuation of application No. PCT/EP2010/062074, filed on Aug. 19, 2010.

(30) Foreign Application Priority Data

Sep. 14, 2009    (DE) .......................... 10 2009 041 093

(51) Int. Cl.
    *B01D 46/00*    (2006.01)

(52) U.S. Cl.
    USPC .............. 55/385.3; 55/498; 55/510; 55/525; 55/529; 55/DIG. 30

(58) Field of Classification Search
    USPC .............. 55/385.3, 378, 379, 503, 509, 521, 55/529, DIG. 28, DIG. 30; 123/198 E; 210/152, 448, 497.3
    See application file for complete search history.

(56) References Cited

U.S. PATENT DOCUMENTS

| 4,924,668 | A   | 5/1990  | Panten et al. |
| 5,223,009 | A   | 6/1993  | Schuster et al. |
| 6,258,144 | B1* | 7/2001  | Huang .......................... 55/385.3 |
| 8,029,586 | B2* | 10/2011 | Linhart et al. ............... 55/385.3 |
| 8,082,729 | B2  | 12/2011 | Rolle et al. |

(Continued)

FOREIGN PATENT DOCUMENTS

| DE | 38 33 957 A1  | 4/1990 |
| DE | 41 30 178 C1  | 8/1992 |
| JP | 8-291772 A    | 11/1996 |
| WO | 2007110170 A1 | 10/2007 |

OTHER PUBLICATIONS

International Search Report of PCT/EP2010/062074, Dated December 2, 2010.

*Primary Examiner* — Duane Smith
*Assistant Examiner* — Minh-Chau Pham
(74) *Attorney, Agent, or Firm* — Laurence A. Greenberg; Werner H. Stemer; Ralph E. Locher

(57) ABSTRACT

A hollow body for capturing particles includes at least one at least partially permeable wall extending between two at least partially oppositely disposed openings and along a first longitudinal direction. The hollow body has a primary cross-sectional shape defining a first cross-sectional area. At least one of the openings defines a second cross-sectional area. The second cross-sectional area is greater than the first cross-sectional area. An exhaust-gas treatment device having an exhaust line and a motor vehicle having an exhaust-gas treatment device are also provided.

9 Claims, 3 Drawing Sheets

U.S. PATENT DOCUMENTS

| | | | |
|---|---|---|---|
| 2003/0084652 A1* | 5/2003 | Freytag et al. | 55/385.3 |
| 2004/0206059 A1* | 10/2004 | Cote, Jr. | 55/385.3 |
| 2008/0289305 A1* | 11/2008 | Girondi | 55/385.3 |
| 2009/0163131 A1* | 6/2009 | Walkinshaw et al. | 454/76 |
| 2011/0067574 A1* | 3/2011 | Walz et al. | 96/422 |
| 2011/0099959 A1* | 5/2011 | Moser et al. | 55/385.3 |

* cited by examiner

HOLLOW BODY FOR CAPTURING PARTICLES IN AN EXHAUST GAS LINE, EXHAUST-GAS TREATMENT DEVICE AND MOTOR VEHICLE

CROSS-REFERENCE TO RELATED APPLICATION

This is a continuation, under 35 U.S.C. §120, of copending International Application No. PCT/EP2010/062074, filed Aug. 19, 2010, which designated the United States; this application also claims the priority, under 35 U.S.C. §119, of German Patent Application DE 10 2009 041 093.7, filed Sep. 14, 2009; the prior applications are herewith incorporated by reference in their entirety.

BACKGROUND OF THE INVENTION

Field of the Invention

The invention relates to a hollow body for capturing particles in an exhaust line, in which the hollow body is disposed, in particular, at a transition region from an exhaust line to an exhaust-gas recirculation line in order to prevent particles from the exhaust line from passing into the exhaust-gas recirculation line. Such hollow bodies are used, in particular, in exhaust systems of (mobile) internal combustion engines. The invention also relates to an exhaust-gas treatment device having an exhaust line and a motor vehicle having an exhaust-gas treatment device.

In the exhaust-gas treatment of exhaust gases of mobile internal combustion engines, such as for example gasoline-combustion and diesel engines, it is nowadays sought to treat those exhaust gases in such a way that they can be discharged into the environment, after having been freed from pollutants to the greatest possible extent. Such an exhaust-gas treatment may be realized, for example, by virtue of the exhaust gases being purified in a catalytic converter and/or in a filter. It is also known for a part of the exhaust gas produced to be re-circulated back into the internal combustion engine in order to attain a reduction in the quantity of nitrogen oxide compounds in the exhaust gas. That means that a part of the exhaust gases is extracted from the exhaust line and transported over an exhaust-gas recirculation line back to the intake side of the internal combustion engine, in order to be introduced together with the intake air into the combustion chamber of the internal combustion engine.

A particular challenge is posed by the purification of exhaust gases of a diesel engine, which include a relatively large amount of unburned hydrocarbon particles, often also referred to as soot particles. A fundamental aim of exhaust-gas purification is to remove those hydrocarbon or soot particles from the exhaust gas of a diesel engine. Soot particles can also have an adverse effect in the recirculation of exhaust gas into the internal combustion engine. A device for capturing particles between an exhaust line and an exhaust-gas recirculation line therefore has the task of preventing the recirculation of hydrocarbon or soot particles, and if appropriate also retaining other solid matter.

Sometimes so-called soot burn-off filters are also used in exhaust lines in order to remove soot particles from the exhaust gas. Those soot burn-off filters are often produced from ceramic materials. Porous, sintered ceramic filters ("wall flow filters") are often used. Ceramic filters are in any case distinguished by a high degree of brittleness. That characteristic is further abetted by the varying temperatures during use in an exhaust line. A situation may easily arise in which small particles become detached from a ceramic filter or from a support mat surrounding the ceramic filter. If such solid bodies are conducted through an exhaust-gas recirculation line back into the combustion chamber of an internal combustion engine or into an exhaust-gas turbocharger, they can cause considerable damage there. The ceramic particles act there as abrasive bodies, and can thus lead to considerable wear to engine components or to parts of a turbocharger.

A filter device disposed in the exhaust-gas recirculation line is capable of removing particles from the re-circulated exhaust gas. A disadvantage of such a filter device is, however, that it can become blocked by the particles. Once trapped by a filter device of that type, particles continue to be held in the filter device by the continuing flow of exhaust gas. As a result, the characteristics of the filter device can change considerably. The permeability of the filter is for example reduced, in such a way that an undesired pressure gradient can form across the filter. The pressure gradient and the permeability in turn have an influence on the amount of exhaust gas being re-circulated. Regular cleaning of the filter device is therefore necessary in order to maintain constant filter characteristics over time.

In order to avoid regular cleaning of the filter device, it is known from German Patent Application DE 38 33 957 A1, corresponding to U.S. Pat. No. 4,924,668, to place an exhaust-gas filter insert directly at a branch point between an exhaust line and the exhaust-gas recirculation line. In that case, the exhaust-gas filter insert is disposed in such a way that the surface runs parallel to the flow direction of the main exhaust-gas flow. It is also specified in that document that the exhaust-gas filter insert should be produced from a porous sintered ceramic or from a sintered metal. A typical porosity for such a filter device may lie between 0.1 and 10 micrometers.

International Publication No. WO 2007/110170 A1, corresponding to U.S. Pat. No. 8,082,729, furthermore discloses the provision of a cross-sectional widening in an exhaust-gas recirculation line, into which widening a screen layer is integrated. The screen layer has—in contrast to a filter—a defined separation efficiency for the particles, in such a way that only particles above a predefined size (corresponding to the mesh size of the screen) are retained. Likewise, with the device proposed in that document, repeated (percussive) contact between the large particles and the robust screen layer can be achieved, in such a way that those large particles are possibly broken down further.

Even though the above-mentioned concepts have in part already proven to be highly effective, there is still a demand for improvement. In particular, the known concepts still do not adequately satisfy the requirements for the integration of such capturing devices for particles in exhaust-gas recirculation systems, in such a way that, for example, the installation location often cannot be freely selected, the expenditure for assembling such capturing devices in exhaust lines is too great, and/or less expensive production of the capturing devices for use in mass production for motor vehicles is not possible.

SUMMARY OF THE INVENTION

It is accordingly an object of the invention to provide a hollow body for capturing particles in an exhaust gas line, an exhaust-gas treatment device and a motor vehicle, which overcome the hereinafore-mentioned disadvantages and alleviate the highlighted technical problems of the heretofore-known bodies, devices and vehicles of this general type. It is sought, in particular, to specify a device which allows the installation location in an exhaust system to be selected more freely and which also permits simple assembly with the fewest possible joining processes. At the same time, particularly low-cost production of a capturing device for use in mass production of motor vehicles should be ensured.

With the foregoing and other objects in view there is provided, in accordance with the invention, a hollow body for capturing particles. The hollow body comprises a primary cross-sectional shape defining a first cross-sectional area, two at least partially oppositely situated openings, at least one of the openings defining a second cross-sectional area, a first longitudinal direction, at least one at least partially permeable wall extending between the two at least partially oppositely situated openings and over the first longitudinal direction, and the second cross-sectional area being larger than the first cross-sectional area.

A hollow body of this type may, for example, be a screen, a fabric, a non-woven filter or the like. This may, in particular, be positioned between an exhaust line and an exhaust-gas recirculation line. In this case, the at least partially permeable wall may, for example, cover the access to the exhaust-gas recirculation line. A main exhaust-gas flow may then pass through the hollow body along the first longitudinal direction from one opening to the other opening, while a partial flow of the exhaust gas passes through the gas-permeable wall of the hollow body and from there into an exhaust-gas recirculation line.

The hollow body has a "primary" cross-sectional shape. This is intended to express that the hollow body has this "primary" cross-sectional shape over at least 50% of the extent in the direction of the first longitudinal direction, in particular over at least 80% of the extent in the direction of the first longitudinal direction. The "primary" cross-sectional shape thus lies preferably between two edge regions of the hollow body, and has a significant influence on the appearance of the hollow body. Consideration is given, in particular, to the following shapes: circle, polygon, multi-tooth, oval, as the "primary" cross-sectional shapes.

In other words, the wall constitutes the peripheral surface of the hollow body, and/or delimits the primary cross-sectional shape or the first cross-sectional area and second cross-sectional area. A single wall (composed of a single material (composite)) is basically preferable, although if appropriate the wall may also be constructed from a plurality of layers (which are concentric and/or bear against one another and/or are connected to one another). The cross-sectional areas referred to herein are defined by the wall or layer positioned closest to the first longitudinal direction.

The two openings preferably have a second cross-sectional area which is larger than the first cross-sectional area. The two openings particularly preferably have a second cross-sectional area of equal size and/or identical (for example circular) shape. A transition from the first cross-sectional area of the primary cross-sectional shape to the second cross-sectional shape of the opening(s) is constructed preferably as a cross-sectional widening, wherein the cross-sectional area widens continuously in a transition region to the opening.

The widening of the hollow body in the edge region close to the at least one opening permits, in particular, a simplified process for joining the hollow body to the (tubular) exhaust line. This applies, in particular, to joining through the use of welding. In this way, it is possible firstly to dispense with collars, flanged portions, indentations, etc. of the exhaust line, which were heretofore required for the connection of such exhaust-gas purification units by welding. The hollow body thus formed can now be inserted and welded into a (smooth) portion of the exhaust line. The primary cross-sectional shape is at the same time remote from the weld point and is not damaged during the joining process. As a result of the hollow body being formed with openings at both sides, it is furthermore possible to realize an exact alignment in the exhaust line.

In accordance with another advantageous feature of the hollow body of the invention, the at least partially permeable wall has elevations and depressions, with a height, extending at least partially along the longitudinal direction. In this case, the "height" describes, for example, a height difference between an elevation and an adjacent depression. The elevations and depressions are, in particular, provided (only) in the region of the primary cross-sectional shape. The elevations and depressions typically yield a type of corrugation in the peripheral direction. The corrugation may also have a toothed form, in the form of semicircles adjoining one another, a stepped form and/or a sinusoidal form.

The gas-permeable wall acts, in particular, as a screen through the use of which particles contained in an exhaust-gas flow are retained as a result of their being larger than a mesh or opening size of the screen. In order to ensure that the flow resistance for the recirculated exhaust through the wall does not become too great and at the same time the wall does not become blocked during operation by retained particles from the exhaust gas, a relatively large surface of the wall is provided in this case. Through the use of the elevations and depressions, the surface of the wall can be enlarged in accordance with the respective requirements.

As already stated, exhaust gas generally flows through the hollow body from one opening to the other opening along the first longitudinal direction. Since, in the preferred embodiment of the hollow body described herein, the elevations and depressions extend in the direction of the longitudinal direction, the exhaust-gas flow also flows along the elevations and depressions and in so doing flushes, in particular, particles accumulated in the depressions out of the depressions in an effective manner. In particular, if both openings of the hollow body have a second cross-sectional area which is widened in relation to the first cross-sectional area, it is possible for particles which have accumulated at the inside in depressions of the hollow body to be blown out of the hollow body in an effective manner. It may even be possible to prevent a (permanent) accumulation of particles in the region of the depressions in this way, because the hollow body does not have any zones situated in a flow shadow. In this way, it is achieved that only exhaust gas containing very small particles passes into the exhaust-gas recirculation system, and the larger particles are converted or stored in corresponding purification elements of the downstream exhaust system.

In accordance with a further advantageous feature of the invention, the primary cross-sectional shape of the hollow body widens by a width on to the second cross-sectional area, and the width amounts to at least 30% and at most 300% of the height. In this case, "height" again refers to the distance between adjacent elevations and depressions. If the ratio is selected to be lower than 30%, the elevations and depressions may then be too small (screen surface area or blow-out effect is reduced), and/or the distance from the primary cross-sectional shape to the outer diameter of the exhaust line may be too small (making the joining process more difficult). On the other hand, if the ratio is exceeded, the production of a hollow body is made more difficult, and likewise the (self-supporting) stability of the hollow body can then be impaired to too great an extent.

In accordance with an added preferable feature of the invention, the hollow body is formed with a smooth wall in the region of at least one opening. In this way, in particular, two (substantially) smooth (annular) edge regions are formed around the openings with the second cross-sectional area. Furthermore, the elevations and depressions could have at least one (first physical) height in the region of the first primary cross-sectional shape, which height decreases in a transition region to the second cross-sectional area, until finally substantially no elevations and no depressions are present at the opening at the second cross-sectional area. The expression "substantially no elevations and depressions" means that compressed, very flat elevations and depressions may by all means be present, but these do not have any significant height in relation to the elevations and depressions in the region of the primary cross-sectional shape.

In accordance with an additional preferable feature of the invention, the hollow body has a first peripheral length in the region of the first cross-sectional area and a second peripheral length in the region of at least one opening, wherein the first peripheral length differs by at most 35% from the second peripheral length.

The cross-sectional area being considered in this case is disposed perpendicular to the first longitudinal direction and is defined by the wall of the hollow body. The peripheral length corresponds to the periphery of the cross-sectional area or the wall in the region of the cross-sectional area.

The peripheral length should not differ to too great an extent in the different cross-sectional areas of the hollow body, because the entire hollow body is preferably composed of a single (screen-like) wall and should generally be produced from one cylindrical blank. In the event of excessive deformation of the blank, the screen size of the wall is changed to an inadmissible extent, as a result of which non-uniform mesh sizes can form in the wall, which can result in excessively large particles being able to pass through the wall. A maximum difference in the peripheral length along the entire length of the hollow body is a suitable parameter for ensuring this.

In accordance with yet another advantageous feature of the invention, the hollow body has a first length and the primary cross-sectional shape has a second length, each of which extend along the first longitudinal direction, wherein the second length amounts to at least 50% and at most 90% of the first length.

The length of the primary cross-sectional shape should extend over a minimum length of the hollow body, in such a way that an adequately large area of partially permeable wall is available for the separation of particles out of the exhaust gases.

The hollow body according to the invention is furthermore advantageous if the second cross-sectional area has a first diameter and the first cross-sectional area has an outer diameter, and furthermore the outer diameter amounts to at least 30% and at most 90% of the first diameter.

Since the outer diameter of the first cross-sectional area is smaller than the first diameter of the hollow body, an acceleration of the exhaust-gas flow takes place within the hollow body. As a result of that acceleration of the exhaust-gas flow, particles which have accumulated on the wall of the hollow body and, in particular, on elevations and/or depressions of the wall can be blown out of the hollow body again in a particularly effective manner. At the same time, the reduction in size of the first cross-sectional area in relation to the second cross-sectional area should not be too great, because as a result of this the flow resistance of the hollow body from one opening to the other opening is increased.

In accordance with yet a further feature of the hollow body of the invention, the at least partially permeable wall includes a fabric composed of wire filaments.

The fabric may be formed in the manner of a 3-heddle twill fabric or 5-heddle twill fabric (so-called "Atlas fabric," TELA fabric or fabric with a 5-heddle Atlas pattern). Such a fabric has warp filaments and weft filaments which are woven with one another at an angle of approximately 90°. In the fabric, the direction along the warp filaments will hereinafter be referred to as the warp direction, and the direction along the weft filaments will hereinafter be referred to as the weft direction. In a fabric of that type, warp filaments and weft filaments are woven in such a way that the weft filaments run in each case above four warp filaments situated one on top of the other, and subsequently below one single warp filament. This profile is repeated for each weft filament over the entire fabric. Two weft filaments situated adjacent one another run in each case below different warp filaments. It is preferable in this case for a weft filament to run in each case below the warp filament after next, below which the directly adjacent weft filament runs. This configuration yields a regularly repeating pattern, which runs obliquely with respect to the weft direction and obliquely with respect to the warp direction, in the fabric. The fabric woven in this way is particularly robust and has a relatively smooth surface.

Through the use of this type of fabric, it is possible to attain a high throughflow with simultaneous stability. In this case, wire filaments (used as warp and weft filaments) of different construction are used, specifically relatively thick warp filaments (for example 160 μm filament diameter) and relatively thin weft filaments (for example 150 μm filament diameter). In each case, a tolerance of +/−4 μm is expedient for the filament diameters, in such a way that warp filaments have a diameter of at least 156 μm and at most 164 μm and weft filaments have a diameter of at least 146 μm and at most 154 μm. In the finished fabric, the relatively thin weft filaments bend more intensely than the relatively thick warp filaments. This influences the shape of the meshes being provided.

Such a fabric has rectangular meshes, which have a greater mesh size in the weft direction than in the warp direction. The mesh size should preferably be approximately 77 μm on average in the warp direction. In this case, a tolerance of +/−6 μm is expedient. The invention accordingly encompasses a mean mesh size in the warp direction of at least 71 μm and at most 83 μm. The mesh size should preferably be 149 μm on average in the weft direction. In this case, a tolerance of +/−10 μm is expedient. The invention accordingly encompasses a mean mesh size in the weft direction of at least 139 μm and at most 159 μm.

The preferred mesh size and preferred filament diameter yield a mesh number of 107 meshes/inch, or approximately 41 meshes/mm [millimeter], in the warp direction and a mesh number of 85 meshes/inch, or approximately 33 meshes/mm [millimeter], in the weft direction.

Furthermore, it is expedient to define a maximum mesh size both in the warp direction and also in the weft direction, so as to ensure that particles above a certain size generally cannot pass through the fabric. 58 μm [micrometers] is proposed as a tolerance for the largest admissible mesh size in the warp direction. A mesh may therefore have at most a mesh size of 135 μm in the warp direction. 84 μm is proposed as a tolerance for the largest admissible mesh size in the weft direction. A mesh may therefore have at most a mesh size of 233 μm in the weft direction.

The properties of a fabric of that type may be checked, for example, through the use of a microscope. The number of filaments per unit of length in the warp direction or weft direction may be determined by counting the filaments per unit of length. The mean mesh size may then be determined by subtracting the filament wire diameter from the pitch (spacing between two filaments in the fabric).

The largest admissible mesh size at least partially specifies the filter permeability. This may be determined through the use of a ball passage test. The largest opening of the meshes in a fabric (nonwoven) is referred to as the ball passage. A precisely round ball can still pass through the fabric, and a relatively large one is retained. It emerges from that definition that, in the case of a rectangular mesh, the smaller of the two mesh sizes (mesh size in the warp direction) substantially determines the ball passage. The admissible ball diameter in a test with the fabric proposed herein should be between 140 µm and 180 µm, preferably between 150 µm and 170 µm, and in particular between 155 µm and 160 µm. The admissible ball passage is therefore larger than the above-specified mesh size in the warp direction. This is the case because, due to the woven structure of the fabric and the filament wire diameter in relation to the mesh sizes, for a defined mesh size, passage openings slightly larger than the defined mesh width arise obliquely with respect to the fabric plane (in particular not orthogonally with respect to the nonwoven plane spanned by the warp direction and weft direction).

The thickness of the fabric should be between 0.4 and 0.5 mm, and should preferably be approximately 0.44 mm. The fabric should have an air permeability of between at least 4000 l/m²s and at most 8000 l/m²s, preferably between at least 5000 l/m²s and at most 7000 l/m²s, and in particular between at least 5500 l/m²s and at most 6000 l/m²s, when the pressure difference acting across the fabric is 2 mbar.

In order to provide for further processing, the fabric should be free from oil films, auxiliary materials and other impurities.

In the form of the fabric being used, the wire filaments are preferably sintered to one another, that is to say, in particular, not welded to one another.

If the fabric is used as a wall of a hollow body in the manner of a screen, it may be distinguished at least by one of the following parameters:

screen area of at least 50 cm² per 1.0 liter displacement volume of the internal combustion engine;
construction with (only) 2 different types of metallic wire filaments of different thickness, which are connected in a nonwoven with different orientation through the use of a sintered connection;
separation efficiency of the screen of at least 0.05 mm, in particular 0.1 mm or even 0.25 mm (particles of a smaller diameter generally flow through the screen);
wall thickness of between 0.3 and 1 mm, in particular between 0.4 and 0.5 mm; and
material of the wall (wire, wire filaments, etc.) with the material number 1.4841 according to the German "Stahlschlüssel" or key to steel.

The mesh size of the screen (and/or of the fabric described above) preferably lies in the range below 0.3 mm, in particular below 0.2 mm and very particularly preferably below 0.15 mm. In this case, the mesh width should preferably likewise be at least 0.05 mm (millimeters).

The hollow body is also advantageous if the at least partially permeable wall is at least partially provided with a catalytically active coating. A conversion of particles which have accumulated on the wall can be effected through the use of such a coating on the wall.

With the objects of the invention in view, there is also provided an exhaust-gas treatment device, comprising an exhaust line having a second longitudinal direction and a third cross-sectional area, at least one hollow body according to the invention disposed in the exhaust line, the second cross-sectional area of the at least one hollow body (substantially) corresponding to the third cross-sectional area, an exhaust-gas recirculation line having an inlet, and the at least one at least partially permeable wall of the at least one hollow body separating the inlet of the exhaust-gas recirculation line from the exhaust line.

With the objects of the invention in view, there is concomitantly provided a motor vehicle, comprising an internal combustion engine, and an exhaust-gas treatment device having an exhaust line and having an exhaust-gas recirculation line for conducting exhaust gases from the exhaust-gas treatment device back to the internal combustion engine. The exhaust-gas recirculation line is separated from the exhaust line by a hollow body according to the invention.

The embodiments and advantages specified for the hollow body according to the invention are analogously applicable and transferable to the exhaust-gas treatment device according to the invention and to the motor vehicle according to the invention.

Other features which are considered as characteristic for the invention are set forth in the appended claims, noting that the features specified individually in the claims may be combined with one another in any desired technologically expedient way and may be supplemented by explanatory facts from the description, with further structural variants of the invention being specified.

Although the invention is illustrated and described herein as embodied in a hollow body for capturing particles in an exhaust gas line, an exhaust-gas treatment device and a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
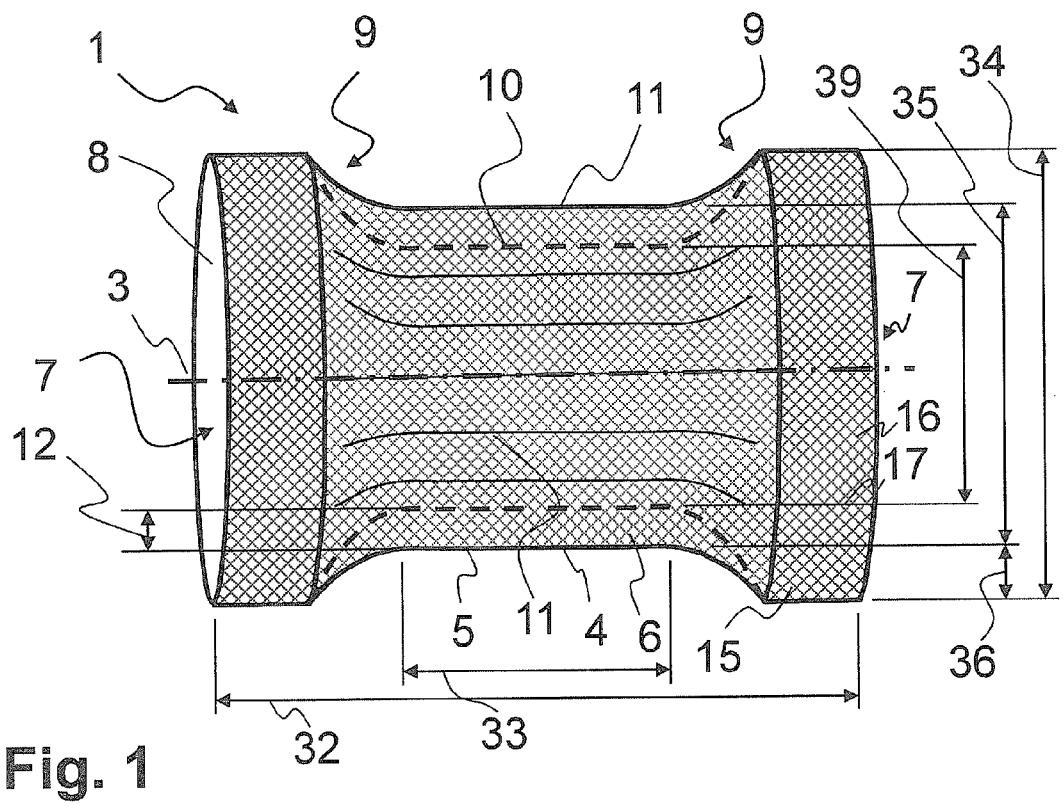
FIG. 1 is a diagrammatic, perspective, first view of a first structural variant of a hollow body according to the invention.
Figure 2:
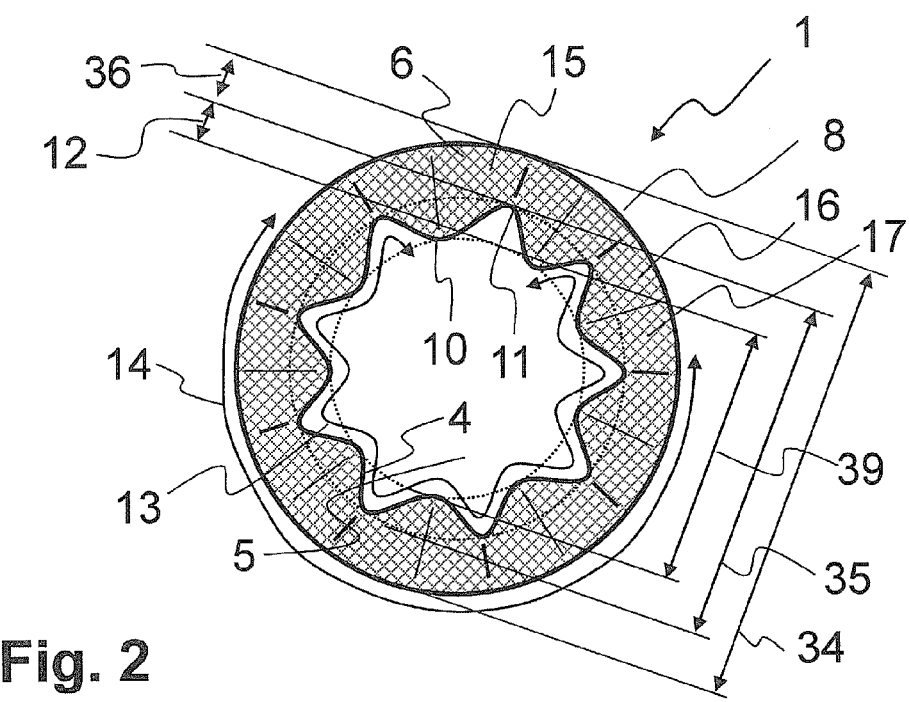
FIG. 2 is an end-elevational, second view of the first structural variant of a hollow body according to the invention.

Referring now to the figures of the drawings in detail and first, particularly, to FIGS. 1 and 2 thereof, there are seen different views of a first structural variant of a hollow body 1 according to the invention. The hollow body 1 has a first longitudinal direction 3. Furthermore, the hollow body 1 has two (identically constructed) openings 7, at which and in the vicinity of which the hollow body 1 has a second cross-sectional area 8. Overall, the hollow body 1 has a first length 32 along the first longitudinal direction 3. The hollow body 1 has a primary cross-sectional shape 4 between the two openings 7, with a first cross-sectional area 5. The first cross-sectional area 5 is smaller than the second cross-sectional area 8.

In the region of the first cross-sectional area 5 and the primary cross-sectional shape 4, the hollow body 1 furthermore has elevations 10 and depressions 11. The primary cross-sectional surface 5 merges, at transition regions 9 in the vicinity of the openings 7, into the second cross-sectional area 8. The elevations 10 and the depressions 11 have a height 12. The second cross-sectional area 8 or the openings 7 have a first diameter 34 which, together with the first length 32, defines maximum outer dimensions of the hollow body 1. The primary cross-sectional shape 4 has an outer diameter 35 and an inner diameter 39. The elevations 10 and the depressions 11 are situated between the outer diameter 35 and the inner diameter 39. The depressions 11 make contact at regular intervals with the outer diameter 35, while the elevations 10 make contact with the inner diameter 39. The outer diameter 35 and the inner diameter 39 differ by twice the height 12 of the elevations 10 and the depressions 11.

The primary cross-sectional shape 4 extends over a second length 33 along the first longitudinal direction 3 of the hollow body 1. The outer diameter 35 and the first cross-sectional area 5 are recessed in relation to the first diameter 34 and the second cross-sectional area 8 by a width 36. The first diameter 34 and the outer diameter 35 differ by twice the width 36. A wall 6 of the hollow body 1 includes a fabric 15 which is constructed from wire filaments 16. The wire filaments 16 may have a (catalytically active) coating 17.

FIG. 2 additionally shows a first peripheral length 13 and a second peripheral length 14. The second peripheral length 14 extends along the wall 6 of the hollow body 1 in the region of the second cross-sectional area 8 or of the opening 7. The first peripheral length 13 extends along the wall 6 of the hollow body 1 in the region of the primary cross-sectional shape 4 or of the first cross-sectional area 5.

Figure 3:
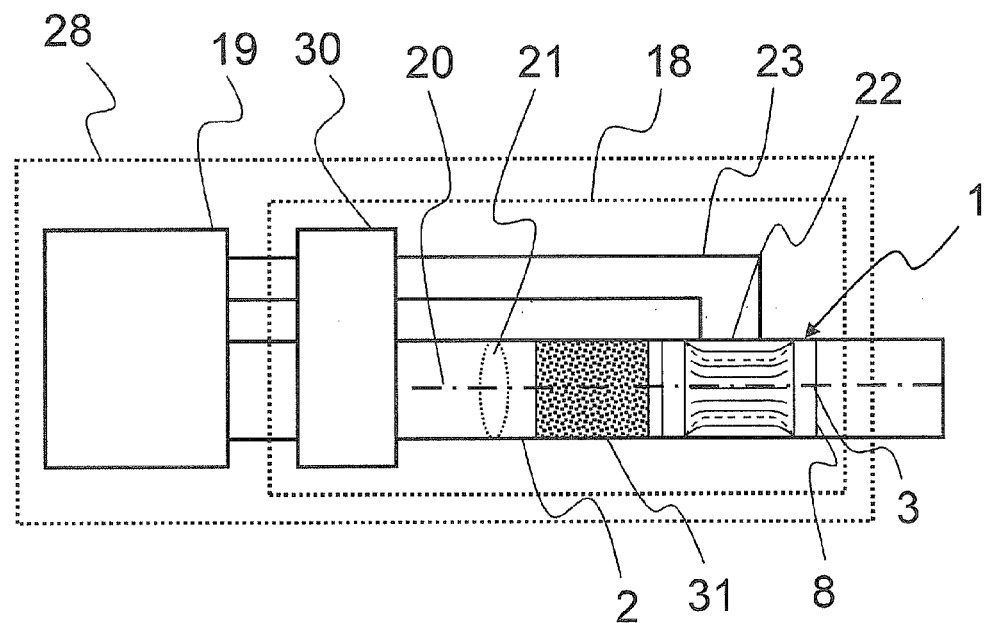
FIG. 3 is a plan view of a motor vehicle having an exhaust-gas treatment device according to the invention and a hollow body according to the invention.

FIG. 3 shows a motor vehicle 28 having an internal combustion engine 19 and having an exhaust line 2 which extends from the internal combustion engine 19. An exhaust-gas treatment device 18 is disposed in the exhaust line 2. The exhaust-gas treatment device 18 has a ceramic filter 31 and also a hollow body 1 according to the invention. An inlet 22 into an exhaust-gas recirculation line 23 is provided in the exhaust line 2 in the region of the hollow body 1 according to the invention. Exhaust gas which flows through the hollow body 1 into the inlet 22 of the exhaust-gas recirculation line 23 passes into a turbocharger 30, which is driven by exhaust gases that flow through the exhaust line 2. Exhaust gas which is compressed by the turbocharger 30 passes onward to the internal combustion engine 19. The exhaust line 2 has a second longitudinal direction 20 and a third cross-sectional area 21. The third cross-sectional area 21 substantially corresponds to the second cross-sectional area 8 of the hollow body 1. The first longitudinal direction 3 of the hollow body 1 and the second longitudinal direction 20 of the exhaust line 2 run coaxially and the second cross-sectional area 8 of the hollow body 1 and the third cross-sectional area 21 of the exhaust line 2 are adapted to one another in such a way that the hollow body 1 fits into the exhaust line 2. The hollow body 1 and the exhaust line 2 are cohesively connected to one another through the use of a welded connection or a brazed connection. The hollow body 1 prevents particles which have become detached from the ceramic filter 31 from being able to pass into the exhaust-gas recirculation line 23 and thus also into the turbocharger 30 or into the internal combustion engine 19. Such particles, which have become detached from a ceramic filter 31, may cause considerable damage in the turbocharger 30 or in the internal combustion engine 19, because they act as abrasive particles there.

Figure 4:
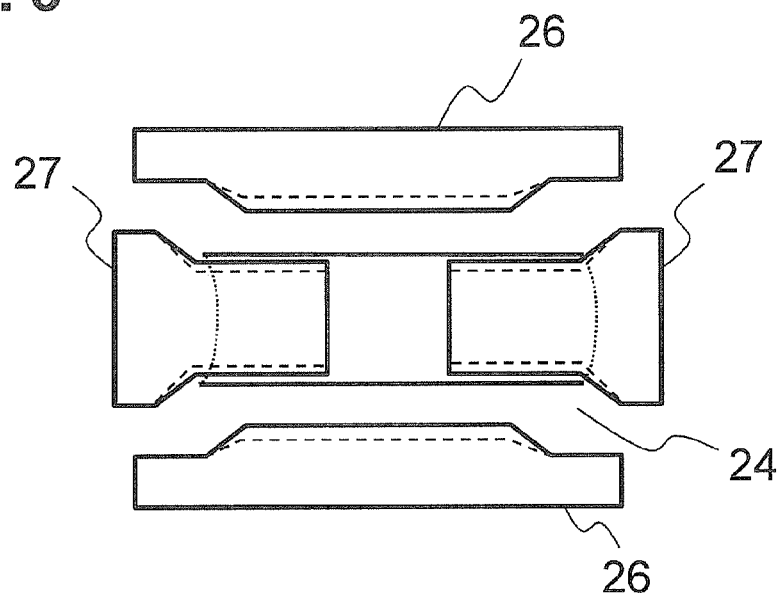
FIG. 4 is an exploded, plan view of a die for producing a hollow body according to the invention.

FIG. 4 shows a die for producing a hollow body according to the invention. The die includes at least one external mold part 26 and at least one internal mold part 27, through the use of which a cylindrical blank 24 can be pressed into the form of a hollow body according to the invention.

It is alternatively also possible for the hollow body to be produced with its primary cross-sectional shape (for example with the elevations and depressions) over the entire length, and to subsequently be flared and smoothed in the edge regions close to the openings.

Figure 5:
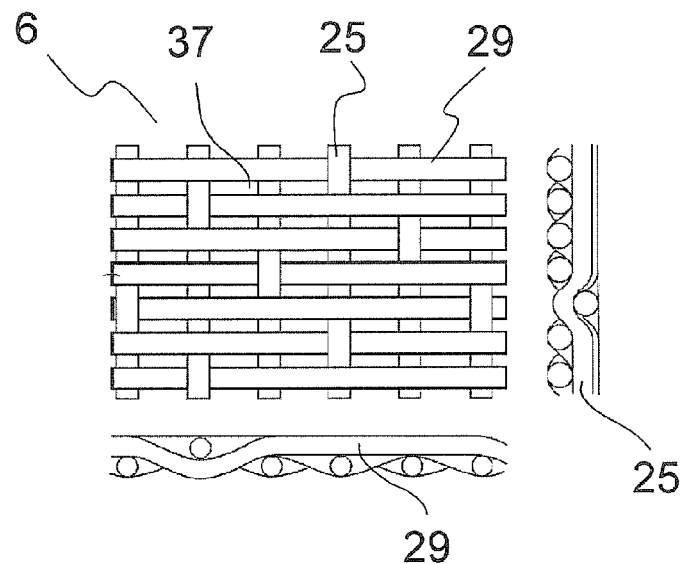
FIG. 5 includes enlarged, fragmentary, front, side and bottom views illustrating a construction of a fabric for the hollow body.

FIG. 5 shows three views of the structure of a wall 6 of a metallic fabric in the manner of a five-heddle fabric (so-called Atlas fabric). In this case, relatively thick warp filaments 25 and relatively thin weft filaments 29 interpenetrate each other only after passing four filaments. Relatively large meshes 37 are formed in this case.

Figure 6:
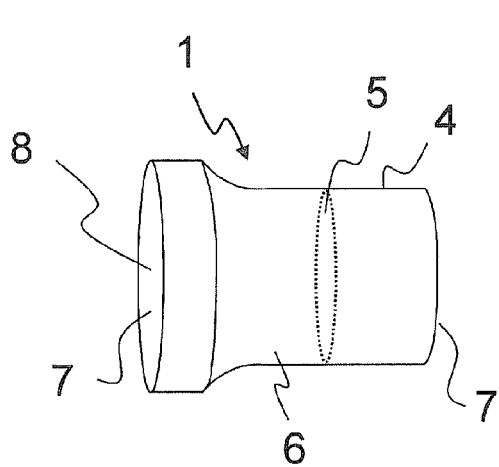
FIG. 6 is a perspective view of a further structural variant of a hollow body according to the invention.
Figure 7:
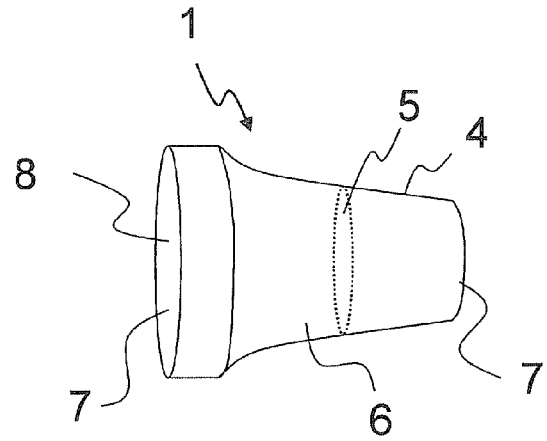
FIG. 7 is a perspective view of an additional structural variant of a hollow body according to the invention.

FIG. 6 and FIG. 7 show further structural variants of the hollow body 1 according to the invention. FIG. 6 shows a hollow body 1 in which a second cross-sectional area 8, which is widened in relation to the first cross-sectional area 5 of the primary cross-sectional shape 4, is provided only at one opening 7. A hollow body of this type can be inserted into an exhaust line in the region of an inlet to an exhaust-gas recirculation line, at which the exhaust line narrows in that region. FIG. 7 shows a hollow body 1 having a primary cross-sectional shape 4 which is formed with a varying first cross-sectional area 5. Neither the hollow body 1 illustrated in FIG. 6 nor that illustrated in FIG. 7 has elevations and depressions in its walls 6.

Merely for the sake of completeness, it is pointed out that numerous modifications may be made to the device described herein without departing from the concept according to the invention.

The invention claimed is:

1. A hollow body for capturing particles, the hollow body comprising:
    a primary cross-sectional shape defining a first cross-sectional area;
    two at least partially oppositely situated openings, at least one of said openings defining a second cross-sectional area;
    a first longitudinal direction;
    at least one at least partially permeable wall extending between said two at least partially oppositely situated openings and over said first longitudinal direction;
    said second cross-sectional area being larger than said first cross-sectional area; and
    a transition in an edge region of at least one of said openings, said transition being defined by a widening between said first cross-sectional area and said second cross-sectional area.

2. The hollow body according to claim 1, wherein said at least partially permeable wall includes elevations and depressions having a height and extending at least partially along said first longitudinal direction.

3. The hollow body according to claim 2, wherein said primary cross-sectional shape widens by a width onto said second cross-sectional area, and said width amounts to at least 30% and at most 300% of said height.

4. The hollow body according to claim 1, wherein said at least one at least partially permeable wall is smooth in vicinity of at least one of said openings.

5. The hollow body according to claim 1, which further comprises:
   a first peripheral length of the hollow body in vicinity of said first cross-sectional area; and
   a second peripheral length in vicinity of at least one of said openings;
   said first peripheral length differing by at most 35% from said second peripheral length.

6. The hollow body according to claim 1, which further comprises:
   a first length of the hollow body extending along said first longitudinal direction;
   said primary cross-sectional shape having a second length extending along said first longitudinal direction; and
   said second length amounting to at least 50% and at most 90% of said first length.

7. The hollow body according to claim 1, wherein said at least one at least partially permeable wall includes a fabric composed of wire filaments.

8. An exhaust-gas treatment device, comprising:
   an exhaust line having a second longitudinal direction and a third cross-sectional area;
   at least one hollow body according to claim 1 disposed in said exhaust line;
   said second cross-sectional area of said at least one hollow body corresponding to said third cross-sectional area;
   an exhaust-gas recirculation line having an inlet; and
   said at least one at least partially permeable wall of said at least one hollow body separating said inlet of said exhaust-gas recirculation line from said exhaust line.

9. A motor vehicle, comprising:
   an internal combustion engine; and
   an exhaust-gas treatment device having an exhaust line and having an exhaust-gas recirculation line for conducting exhaust gases from said exhaust-gas treatment device back to said internal combustion engine;
   said exhaust-gas recirculation line being separated from said exhaust line by a hollow body according to claim 1.

* * * * *